United States Patent [19]
Shirai

[11] Patent Number: 5,365,060
[45] Date of Patent: Nov. 15, 1994

[54] RELATIVE VELOCITY SENSING DEVICE

[75] Inventor: Tomoyuki Shirai, Tokyo, Japan

[73] Assignee: Asahi Kogaku Kogyo Kabushiki Kaisha, Tokyo, Japan

[21] Appl. No.: 38,783

[22] Filed: Mar. 29, 1993

[30] Foreign Application Priority Data

Mar. 30, 1992 [JP] Japan ................................. 4-103687

[51] Int. Cl.$^5$ ................................................ G01D 5/34
[52] U.S. Cl. ........................... 250/231.16; 250/237 G
[58] Field of Search ....................... 250/231.14, 231.16, 250/237 G; 73/510, 514; 324/175; 369/44.32, 44.34, 44.36, 44.28

[56] References Cited

U.S. PATENT DOCUMENTS

| | | | |
|---|---|---|---|
| 3,654,479 | 4/1972 | Catherin ........................ | 250/237 G |
| 4,982,397 | 1/1991 | Yokota ........................... | 369/44.32 |
| 5,163,034 | 11/1992 | Kitai et al. ..................... | 369/44.29 |
| 5,189,654 | 2/1993 | Minakuchi ..................... | 369/44.36 |

*Primary Examiner*—David C. Nelms
*Attorney, Agent, or Firm*—Sandler Greenblum & Bernstein

[57] ABSTRACT

A relative velocity sensing device for sensing an optical beam spot, for example, by using a tracking error difference signal that fluctuates as a sine-wave in accordance with a movement of the beam spot. The tracking error difference signal is converted into a first sawtooth wave signal, and a second sawtooth wave signal, having a phase which is offset from the first sawtooth wave signal by one half of the period thereof. A first differential signal is obtained in accordance with the first sawtooth wave signal, and a second differential signal is obtained in accordance with the second sawtooth wave signal. The level of a tracking error sum signal is shifted to obtain a level-shifted signal, so that a polarity signal is obtained. The first differential signal is selected when the polarity signal is positive, and the second differential signal is selected when the polarity signal is negative and, thus, a velocity signal showing the velocity of the beam spot with a high accuracy may be obtained.

11 Claims, 4 Drawing Sheets

RELATIVE VELOCITY SENSING DEVICE

BACKGROUND OF THE INVENTION

1. Field of the Invention

The present invention relates to a device for sensing a velocity of a moving object. The device may be provided in an optical disk device, for example, to sense a velocity of an optical beam spot relative to an optical disk.

2. Description of the Related Art

In an optical disk device, a seek operation in which an optical head is moved from one track to another track on an optical disk must be carried out at high speed and with great accuracy. Namely, an optical beam spot radiated onto an optical disk should be moved at high speed and be positioned exactly at a predetermined track of the disk. The reliability of the seek operation largely depends upon the quality of a signal indicating the relative velocity between the optical beam spot and each of tracks on the disk.

Conventionally, the relative velocity has been sensed as follows.

A beam reflected from the disk is detected by two photo detectors disposed at positions adjacent to each other. Then, a difference between two signals outputted from the two photo detectors, i.e., a difference signal, is obtained. In the seek operation, since the optical beam spot is moved in a radial direction of the disk and alternately traverses lands (i.e., tracks) and grooves formed on the disk, the beam reflected from the disk changes periodically, and thus, the difference signal also changes periodically.

Namely, the waveform of the difference signal is determined in accordance with the velocity of the optical beam spot relative to the disk, and the inclination of the waveform is in proportion to the velocity of the optical beam spot. In other words, although the inclination does not show the velocity directly, the inclination has a value which is equal to a differential value obtained by differentiating the waveform with respect to time. Accordingly, the velocity is obtained by multiplying the differential value by a proportional coefficient which changes in accordance with the positional relationship between the optical beam spot and the track.

Thus, the proportional coefficient changes at every position of the disk, and the waveform of the difference signal does not show the moving velocity of the optical beam spot directly. Therefore, in a conventional device, it is difficult to obtain the velocity of the optical beam spot at high speed and with great accuracy.

SUMMARY OF THE INVENTION

Therefore, an object of the present invention is to provide a relative velocity sensing device by which a velocity of a moving object can be sensed at high speed and with great accuracy.

According to the present invention, there is provided a device for sensing a relative velocity between a first part and a second part, comprising outputting means, converting means, generating means, differentiating means, and selecting means.

The outputting means outputs a first sine-wave signal in accordance with a change in the relative position between the first and second parts. The converting means converts the first sine-wave signal to a first sawtooth wave signal fluctuating with the same period as the first sine-wave signal. The generating means generates a second sawtooth wave signal, the phase of which is offset from the phase of the first sawtooth wave signal. The differentiating means differentiates the first and second sawtooth wave signals to generate first and second differential signals, respectively. The selecting means alternately selects the first and second differential signals to obtain a velocity signal showing the relative velocity between the first part and the second part.

Further, according to the present invention, there is provided a device for sensing the relative velocity between a first part and a second part, comprising outputting means, generating means, first obtaining means, second obtaining means, and selecting means.

The outputting means outputs a first sawtooth wave signal in accordance with a change in the positional relationship between the first and second parts. The first sawtooth wave signal periodically varies in accordance with characteristics of the first or second part. The generating means generates a second sawtooth wave signal, the phase of which is offset from the phase of the first sawtooth wave signal. The first obtaining means obtains a first velocity signal in accordance with the first sawtooth wave signal. The second obtaining means obtains a second velocity signal in accordance with the second sawtooth wave signal. The selecting means alternately selects the first and second velocity signals to obtain a third velocity signal showing a relative velocity between the first and second parts.

Furthermore, according to the present invention, there is provided a device for sensing a relative velocity between a beam spot and an optical disk, comprising outputting means, generating means, first obtaining means, second obtaining means, and selecting means.

The outputting means outputs a first positional signal having an increasing portion in which a value increases substantially linearly as the beam spot moves on the optical disk from one groove to an adjacent one of the grooves. The generating means generates a second positional signal, a phase of which is offset from a phase of the first positional signal. The first obtaining means obtains a first velocity signal in accordance with the first positional signal. The second obtaining means obtains a second velocity signal in accordance with the second positional signal. The selecting means selects the first and second velocity signals to obtain a third velocity signal showing a relative velocity between the beam spot and the optical disk.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
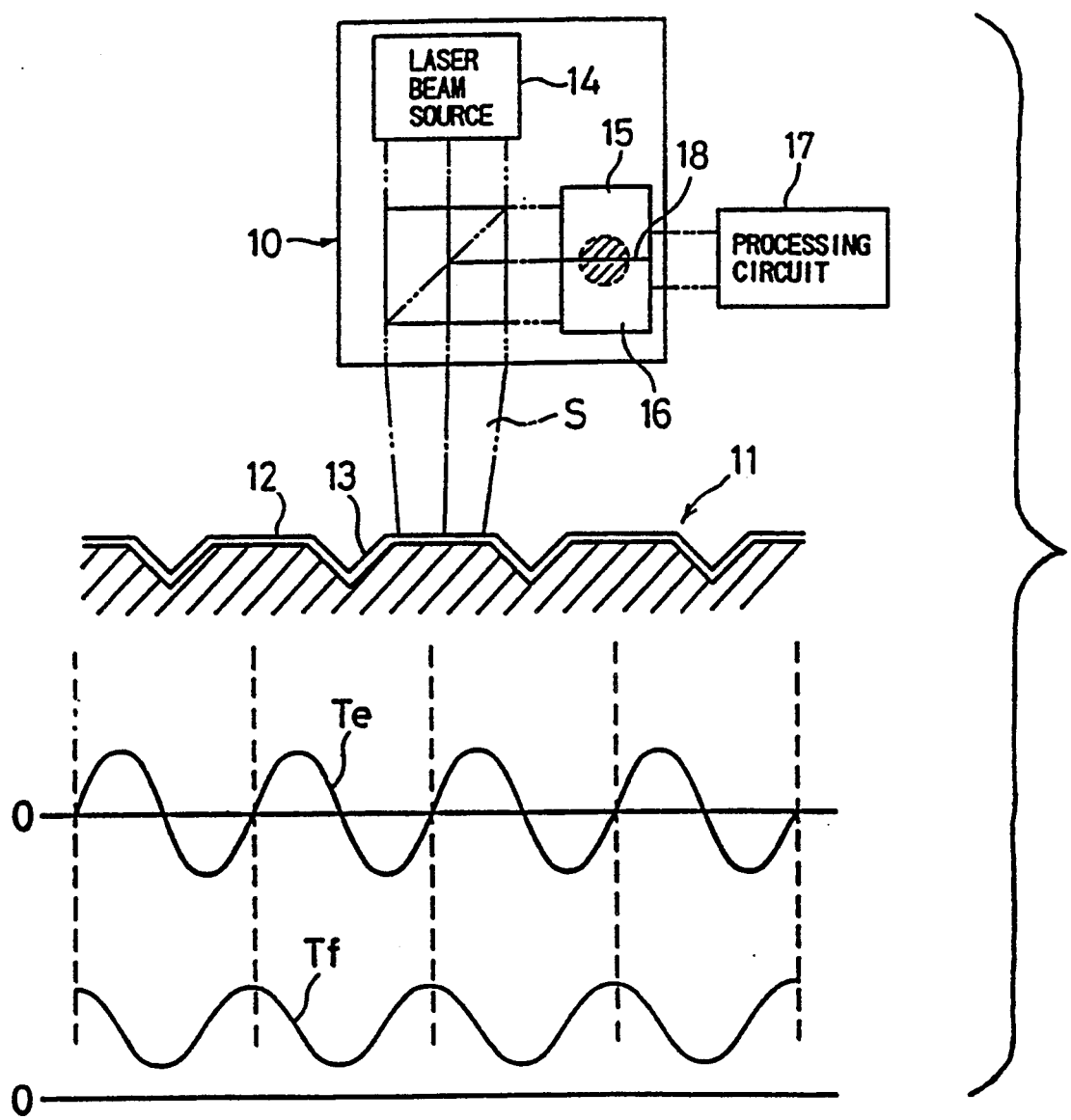
FIG. 1 is a diagram showing signals outputted from a processing circuit when an optical beam spot moves at a constant velocity.

The present invention will now be described with reference to the embodiment shown in the drawings.

FIG. 1 shows signals outputted from a processing circuit 17, connected to an optical unit 10, when an optical beam spot S moves at a constant velocity in a radial direction of an optical disk 11.

A beam is radiated from a laser source 14 provided in the optical unit 10, and thus, the optical beam spot S is produced by an optical system (not shown) and outputted from the optical unit 10. The optical beam spot S is radiated onto a surface of the optical disk 11 so that a signal recorded on a land (or a track) 12 of the optical disk 11 is reproduced. The optical disk 11 is provided with lands 12 and grooves 13, which are alternately arranged concentrically on the optical disk 11.

The optical beam spot S is reflected by the optical disk 11, and the reflected beam is detected by two photo detectors 15 and 16, which are located at positions adjacent to each other in the optical unit 10. A boundary line 18 formed between the photo detectors 15 and 16 corresponds to a tangential direction of the track 12 of the optical disk 11. Output signals of the photo detectors 15 and 16 are inputted into the processing circuit 17 to obtain a tracking error difference signal Te and a tracking error sum signal Tf. The tracking error difference signal Te is obtained by subtracting a signal from the photo detector 15 from a signal from the photo detector 16. Namely, when the optical beam spot S is located at the center of the track 12, the tracking error difference signal Te is zero. The tracking error sum signal Tf is obtained by adding a signal from the photo detector 15 to a signal from the photo detector 16.

In a seek operation, the optical beam spot S is moved in a radial direction of the optical disk 11, and alternately traverses the lands 12 and the grooves 13. As shown in FIG. 1, when the optical beam spot S is moved at a constant velocity, the tracking error difference signal Te and the tracking error sum signal Tf are varied as sine-waves. Namely, the processing circuit 17 outputs sine-wave signals in accordance with a change in a relative position between the beam spot S and the optical disk 11, and the period of each of the sine-wave signals is varied in accordance with a relative velocity between the optical beam spot S and the disk 11.

In FIG. 1, when the optical beam spot is positioned approximately at the center of land 12, the tracking error difference signal Te is 0, and the tracking error sum signal Tf shows a peak value. Conversely, when the optical beam spot is positioned approximately at the center of groove 13, the tracking error difference signal Te is 0, and the tracking error sum signal Tf shows a minimum value.

Figure 2:
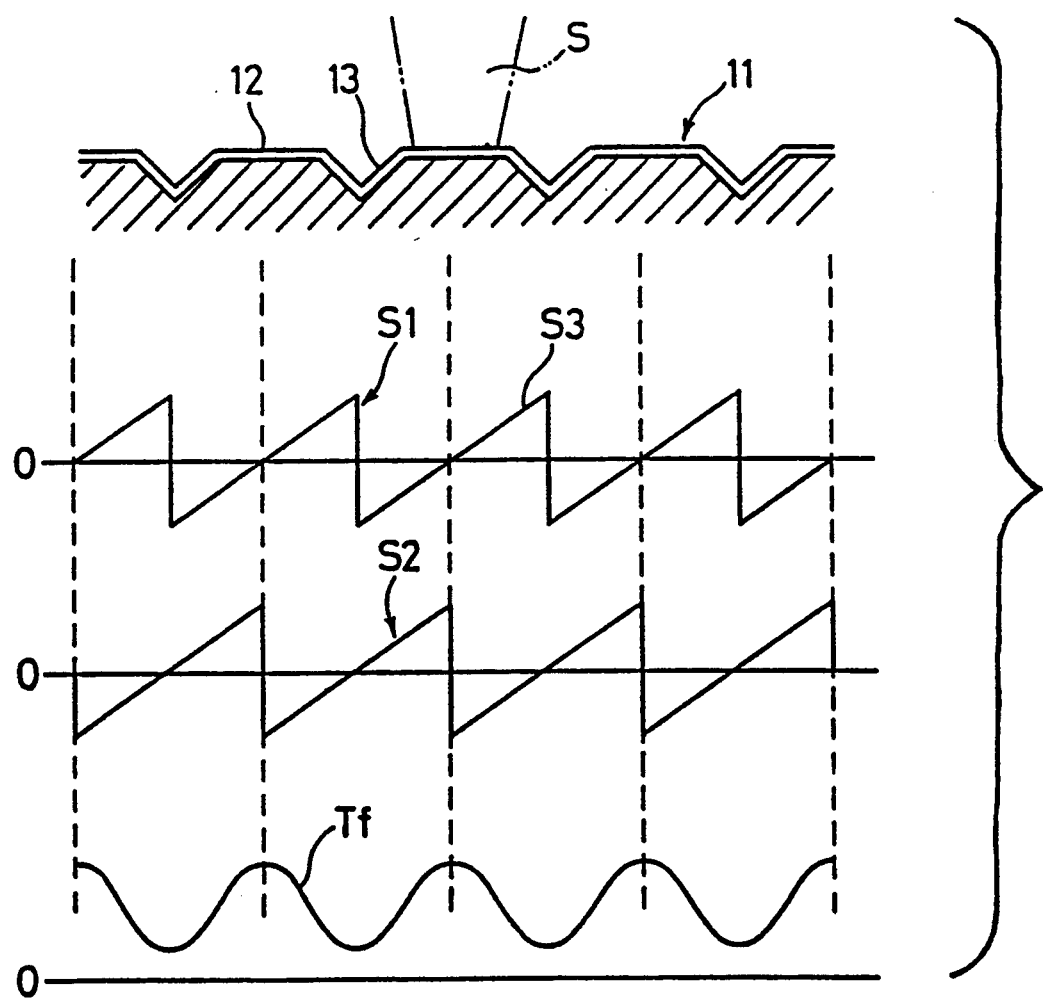
FIG. 2 is a diagram showing a first sawtooth wave signal and a second sawtooth wave signal under the same condition as that of FIG. 1.

In this embodiment, to obtain a signal exactly showing a moving velocity of the beam spot at every moment, as shown in FIG. 2, the tracking error difference signal Te fluctuating as a sine-wave is converted to a first sawtooth wave signal S1 fluctuating with the same period as the tracking error difference signal Te, and the first sawtooth wave signal S1 is offset by one half of the period of the first sawtooth wave signal S1 to generate a second sawtooth wave signal S2. Note, the tracking error sum signal Tf is not converted to a sawtooth wave signal like the first sawtooth wave signal S1, but remains a sine-wave signal.

The first and second sawtooth wave signals S1 and S2 are obtained by processing the tracking error difference signal Te as described later with reference to FIG. 4. The first sawtooth wave signal S1 indicates a position of the beam spot S, and has an increasing portion S3 which increases substantially linearly as the beam spot S moves from one to an adjacent one of the grooves 13. The increasing portion S3 corresponds directly to a position of the beam spot S. Since the increasing portion S3 extends over a relatively wide range of the sawtooth wave signal S1 as a whole, a velocity signal obtained by differentiating the first sawtooth signal S1 with respect to time shows a relative velocity of the beam spot S with a high degree of accuracy. Similarly, by differentiating the second sawtooth wave signal S2 with respect to time, a signal showing a relative velocity of the beam spot S with a high degree of accuracy is obtained.

Figure 3:
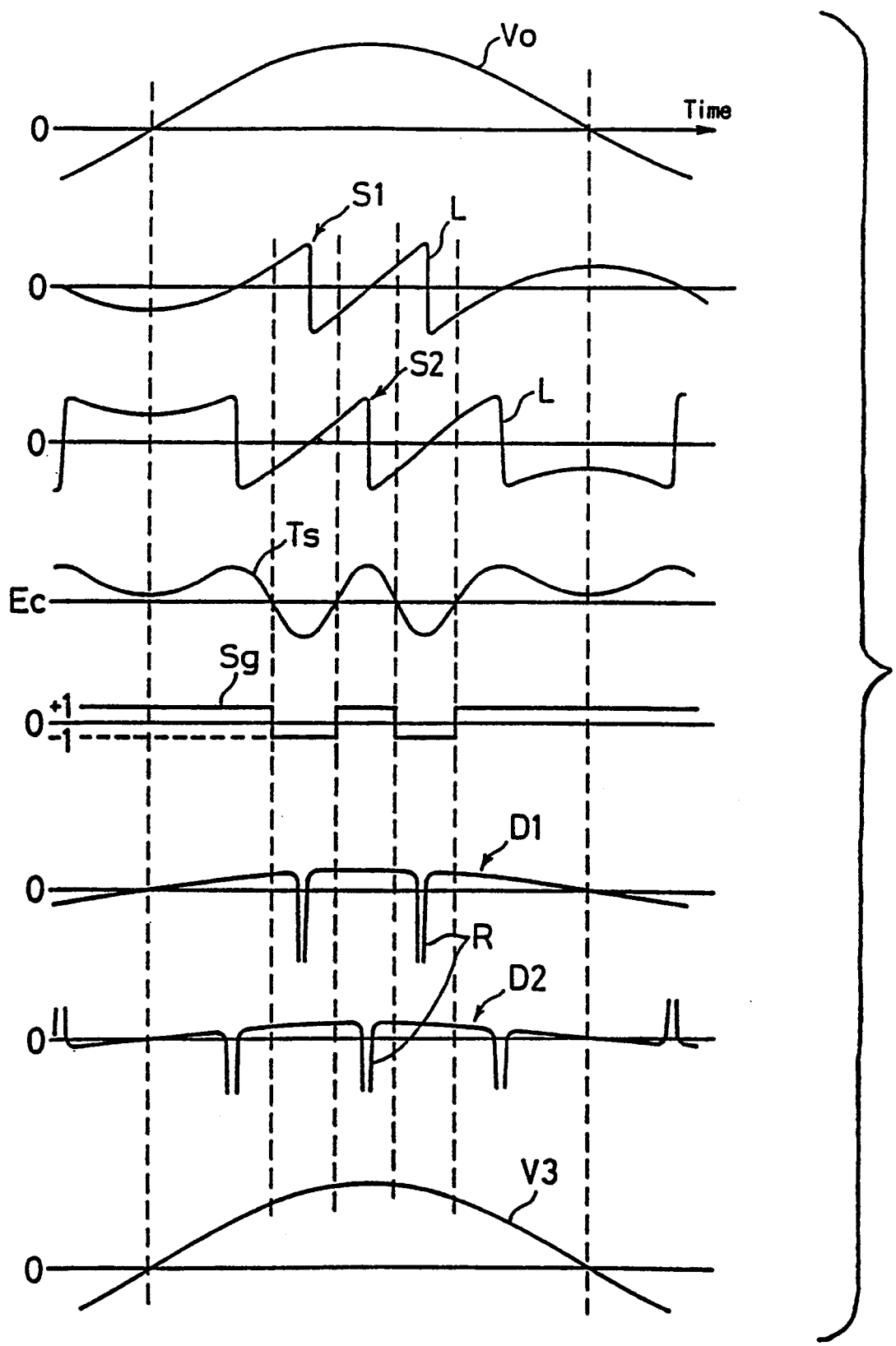
FIG. 3 is a diagram showing how a velocity signal is obtained in an embodiment of the present invention.

With reference to FIG. 3, how the velocity signal is obtained is described below, for a case in which the moving velocity V0 of the optical beam spot S is changed from an accelerating condition to a deccelerating condition in such a manner as to describe a mountain-shape curve.

When the moving velocity V0 is changed as shown by the mountain-shape curve, the first and second sawtooth wave signals S1 and S2 are changed as shown in FIG. 3. Namely, the sawtooth wave signals S1 and S2 fluctuate as sawtooth waves, respectively, at a portion in which a change in the moving velocity V0 is relatively small, while the sawtooth wave signals S1 and S2 are deformed at a portion thereof in which a change in the moving velocity V0 is relatively large. The first and second sawtooth wave signals S1 and S2 are differentiated with respect to time, so that a first differential signal D1 and a second differential signal D2 are generated.

In these differential signals D1 and D2, large ripples R rise or fall in correspondence to portions L, at which the sawtooth wave signals S1 and S2 are abruptly changed, and the portions L do not show a relative position between the beam spot S and a track of the disk 11. Further, since the first and second differential signals D1 and D2 have phases which are offset from each other, the ripples R of the first and second differential signals D1 and D2 are generated at different positions from each other. Accordingly, by alternately selecting the first and second differential signals D1 and D2, a signal which is not affected by the ripples R and which shows the moving velocity V0 of the beam spot S with a high degree of accuracy can be obtained.

In this selecting operation, the level of the tracking error sum signal Tf is first shifted in such a manner that the mid value of the fluctuation of the tracking error sum signal Tf is equal to a reference level Ec, to obtain a level-shifted signal Ts. Then, a polarity of the level-shifted signal Ts relative to the reference level Ec is sensed to obtain a polarity signal Sg, which has a positive polarity when the level-shifted signal Ts has a positive polarity, and which has a negative polarity when the level-shifted signal Ts has a negative polarity. When the polarity signal Sg has a positive polarity, the signal wave of the first differential signal D1 is selected, and when the polarity signal Sg is negative, the signal wave of the second differential signal D2 is selected. Thus, a velocity signal V3 indicating the moving velocity of the beam spot S with a high degree of accuracy is obtained.

Note, in FIG. 3, for easy understanding, the amount of the velocity signal V3 shown is enlarged.

Further, note that since a phase of the tracking error sum signal Tf is different from a phase of the tracking error difference signal Te by a quarter of the period of the tracking error difference signal Te, a phase of the shifted signal Ts is different from a phase of the sawtooth wave signal S1 by a quarter of the period of the sawtooth wave signal S1.

Figure 4:
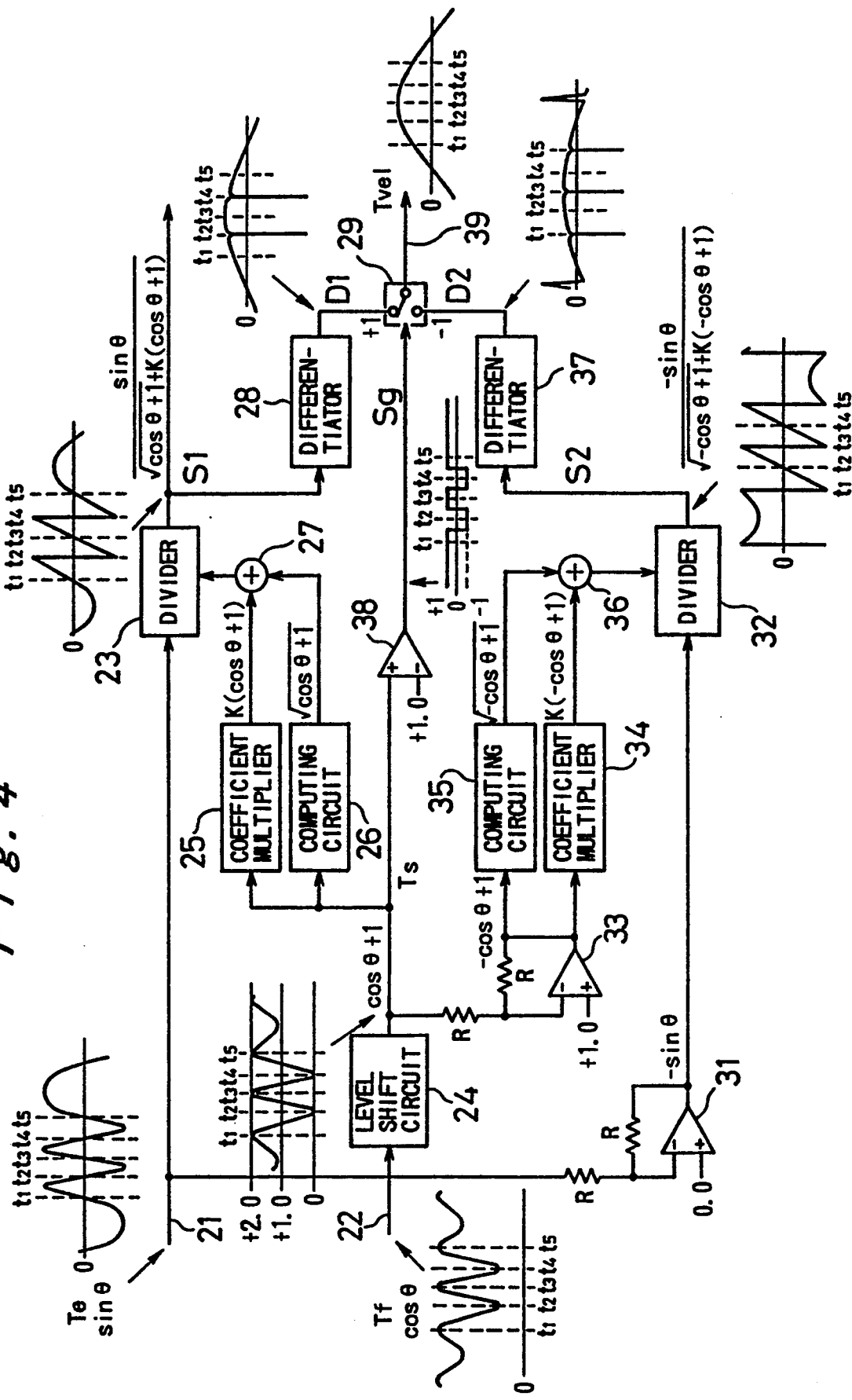
FIG. 4 is a block diagram showing a circuit of the embodiment of the present invention.

FIG. 4 shows a circuit of an embodiment of the present invention.

In this circuit, the tracking error difference signal Te (where Te=sin $\theta$) is inputted to a first terminal 21, and the tracking error sum signal Tf (where Tf=cos $\theta$) is inputted to a second terminal 22. The tracking error difference signal Te and tracking error sum signal Tf fluctuate as a sine-wave or a cosine-wave, respectively, when the beam spot S moves at a constant velocity. In the example shown in FIGS. 3 and 4, since the moving velocity V0 changes as a mountain-shape curve as shown in FIG. 3, periods of the tracking error difference signal Te and tracking error sum signal Tf are changed in accordance with a change in velocity of the beam spot S.

A construction by which the first differential signal D1 is obtained is described below.

The tracking error difference signal Te is inputted into a divider 23, and a division is carried out to convert the tracking error difference signal Te into the sawtooth wave signal. A signal corresponding to a denominator of the sawtooth wave signal, used for carrying out the division of the tracking error difference signal Te is also inputted into the divider 23. This signal indicating the denominator is generated by using the sum signal Tf which is inputted through the second input terminal 22. The level of this sum signal Tf is shifted by a level shift circuit 24 in such a manner that the peak value of the sum signal Tf is equal to "2". In other words, "1" is added to the sum signal Tf by the level shift circuit 24. This level-shifted signal Ts (where Ts=cos $\theta$+1) is multipled by a predetermined coefficient K by a coefficient multiplier 25, and is inputted into a square root computing circuit 26 to obtain a square root of the level-shifted signal Ts. An output signal (K(cos $\theta$+1)) of the coefficient multiplier 25 and an output signal ((cos $\theta$+1)$^{\frac{1}{2}}$) of the square root computing circuit 26 are added to each other by an adder 27, and are then inputted into the divider 23.

An output signal of the divider 23, namely:

$$\sin \theta/((\cos \theta+1)^{\frac{1}{2}}+K(\cos \theta+1))$$

is the first sawtooth wave signal S1 (see FIG. 3), which is inputted into a first differentiator 28, and thus the first differential signal D1 is outputted to a switch 29 by the differentiator 28.

A construction by which the second differential signal D2 is obtained is described below. This construction is basically the same as that by which the first differential signal D1 is obtained.

The tracking error difference signal Te is inputted into an operational amplifier 31, and thus the polarity of the tracking error difference signal Te is inverted and outputted from the operational amplifier 31. This negative tracking error difference signal Te (where Te=−sin $\theta$) is inputted into a divider 32 to be converted into the sawtooth wave signal. A signal corresponding to a denominator used for carrying out the division of the negative tracking error difference signal Te is also inputted into the divider 32. This signal indicating the denominator is generated by using the sum signal Tf which is inputted through the second input terminal 22, similar to the calculation of the divider 23. Namely, the level of this sum signal Tf is shifted by a level shift circuit 24 in such a manner that the peak value of the sum signal Tf is equal to "2", and then the polarity of the sum signal Tf is inverted by an operational amplifier 33 based on "1" as a reference. An output signal (−cos $\theta$+1) of the operational amplifier 33 is multiplied by a predetermined coefficient K in a coefficient multiplier 34, and is inputted into a square root computing circuit 35 to obtain a square root of the inverted signal. An output signal (K(−cos $\theta$+1)) of the coefficient multiplier 34 and an output signal ((−cos $\theta$+1)$^{\frac{1}{2}}$) of the square root computing circuit 35 are added to each other by an adder 36, and then inputted into the divider 32.

An output signal of the divider 32, namely:

$$-\sin \theta/((-\cos \theta+1)^{\frac{1}{2}}+K(-\cos \theta+1))$$

is the second sawtooth wave signal S2 (see FIG. 3), which is inputted into a second differentiator 37, and thus the second differential signal D2 is outputted to the switch 29 by the differentiator 37.

An output signal Ts (where Ts=cos $\theta$+1) of the level shift circuit 24 is inputted into a comparator 38, which outputs a positive polarity signal Sg (=+1) when the signal Ts is larger than "1", and outputs a negative polarity signal Sg (=−1) when the signal Ts is smaller than "1". The switch 29 is switched in accordance with the polarity signal Sg, so that the switch 29 is connected to the first differentiator 28 when the polarity signal Sg is positive, and is connected to the second differentiator 37 when the polarity signal Sg is negative. Therefore, as shown in FIG. 3, a velocity signal V3 which is obtained by alternately selecting one of the first and second differential signals D1 and D2 is outputted from an output terminal 39 of the switch 29.

As described above, in the embodiment, the first and second sawtooth wave signals S1 and S2 which have different phases from each other are generated in accordance with a sine-wave signal showing a relative position between the beam spot S and a track of the optical disk 11, and the first and second differential signals D1 and D2 indicating approximately the correct moving velocity of the beam spot S are generated in accordance with the sawtooth wave signals S1 and S2. Thus, a signal which is not affected by the ripples R is selected from the differential signals D1 and D2, and thus, the velocity signal V3 accurately showing a moving velocity of the beam spot S is obtained. Therefore, according to the embodiment, the performance of an optical head being positioned to a predetermined track of the optical disk 11 is improved.

While the embodiment described above is applied to an optical disk device, the present invention is not restricted to this application. Namely, the present invention can be applied to a sensing mechanism by which an optical beam passing through a slit formed in a rotational disk in a rotary encoder, for example, is sensed. Further, the present invention can be applied to a sensing mechanism by which a moving velocity of a magnetic head relative to a magnetic disk is sensed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 4-103687 (filed on Mar. 30, 1992) which is expressly incorporated herein by reference in its entirety.

We claim:

1. A device for sensing a relative velocity between a first object and a second object comprising:
    means for outputting a first sine-wave signal in accordance with a change in a relative position between said first and second objects;
    means for converting said first sine-wave signal to a first sawtooth wave signal fluctuating with a same period as said first sine-wave signal;
    means for generating a second sawtooth wave in accordance with said first sine-wave signal in such a manner that a phase of said second sawtooth wave signal is offset from a phase of said first sawtooth wave signal;
    means for differentiating said first and second sawtooth wave signals to generate first and second differential signals, respectively; and
    means for alternately selecting between said first and second differential signals to obtain a velocity signal representing a relative velocity between said first object and said second object.

2. A device according to claim 1, wherein a period of said first sine-wave signal varies in accordance with said relative velocity between said first and second objects.

3. A device according to claim 2, wherein said second object is a recording portion of a recording medium on which information is recorded, said first object is a beam spot radiated onto said recording portion, and said outputting means comprises two photo detectors arranged in such a manner that each output signal of said photo detectors is changed in accordance with a positional relationship between said beam spot and said recording portion.

4. A device according to claim 3, wherein said first sine-wave signal is obtained by subtracting a signal outputted from one of said photo detectors from a signal outputted from the other of said photo detectors.

5. A device according to claim 1, wherein each of said first and second sawtooth wave signals has a portion that varies substantially linearly in accordance with said change in said relative position between said first and second objects.

6. A device according to claim 1, wherein a phase of said second sawtooth wave signal is different from a phase of said first sawtooth wave signal by one half of a period of said first sawtooth wave signal.

7. A device according to claim 6, further comprising means for generating a second sine-wave signal, a phase of which is different from a phase of said first sawtooth wave signal by a quarter of the period of said first sawtooth wave signal, said selecting means selecting said first and second differential signals in accordance with said second sine-wave signal.

8. A device according to claim 1, further comprising means for outputting a second sine-wave signal in accordance with said change of a relative position between said first and second objects, said second object being a recording portion of a recording medium on which information is recorded, said first object being a beam spot radiated onto said recording portion, said outputting means comprising two photo detectors arranged in such a manner that each output signal of said photo detector is changed in accordance with a positional relationship between said beam spot and said recording portion, said second sine-wave signal being obtained by adding a signal outputted from one of said photo detectors and a signal outputted from the other of said photo detectors.

9. A device according to claim 8, wherein said selecting means comprises:
    means for shifting said second sine-wave signal in such a manner that a mid value of the fluctuation of said second sine-wave signal is equal to a predetermined level;
    means for determining a polarity of said shifted second sine-wave signal relative to said predetermined level; and
    means for selecting said first differential signal when said polarity is positive, and said second differential signal when said polarity is negative.

10. A device for sensing a relative velocity between a first object and a second object comprising:
    means for outputting a first sawtooth wave signal in accordance with a change in a positional relationship between said first and second objects, said first sawtooth wave signal periodically varying in accordance with a characteristic of said first or second object;
    means for generating a second sawtooth wave in accordance with said first sine-wave signal in such a manner that a phase of said second sawtooth wave signal is offset from a phase of said first sawtooth wave signal;
    means for obtaining a first velocity signal in accordance with said first sawtooth wave signal;
    means for obtaining a second velocity signal in accordance with said second sawtooth wave signal; and
    means for alternately selecting between said first and second velocity signals to obtain a third velocity signal representing a relative velocity between said first and second objects.

11. A device according to claim 7, said selecting means shifting a level of said second sine-wave signal by a predetermined value to obtain a polarity signal, and alternately selecting said first and second differential signals based on a polarity of said polarity signal.

* * * * *